May 2, 1933.  G. L. WEATHERS  1,906,780

CYLINDER HEAD FOR AIR COOLED MOTORS

Filed Nov. 12, 1929  2 Sheets-Sheet 1

Inventor
Grover L. Weathers

By Clarence A. O'Brien
Attorney

May 2, 1933.    G. L. WEATHERS    1,906,780
CYLINDER HEAD FOR AIR COOLED MOTORS
Filed Nov. 12, 1929    2 Sheets-Sheet 2
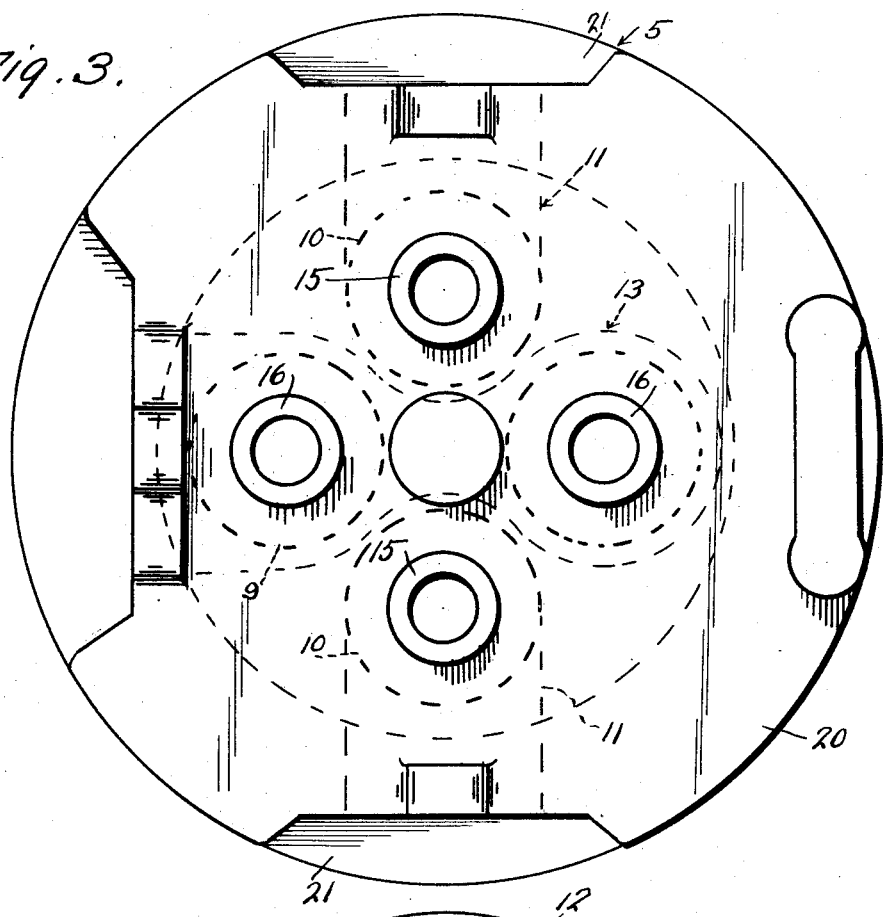
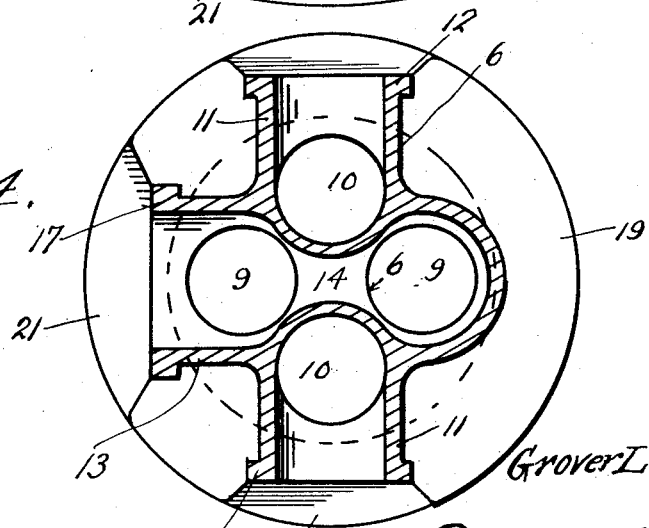
Inventor
Grover L. Weathers
By Clarence A. O'Brien
Attorney Patented May 2, 1933

1,906,780

UNITED STATES PATENT OFFICE

GROVER L. WEATHERS, OF VISALIA, CALIFORNIA

CYLINDER HEAD FOR AIR COOLED MOTORS

Application filed November 12, 1929. Serial No. 406,613.

This invention relates broadly to internal combustion engines, and more particular reference to that type of internal combustion engine known in the art as air cooled motors.

The primary object of this invention is to provide a cylinder head especially adapted for air cooled motors and wherein the same embodies a plurality of valves arranged therein, and so disposed relative to one another that the intake gas flowing through the intake passages controlled by said valves will pass over the center of the cylinder head and between adjacent and opposite portions of the exhaust passages thus cooling the valve seats within the exhaust passages.

A still further object of the invention is to provide a four valve cylinder head for air cooled motors, wherein the head comprises two exhaust valves arranged on opposite sides of the head, and an intake passage extending between the adjacent ends of the exhaust valves, which intake passage is provided with a pair of intake valves, so that the intake gas passing through the intake passage to enter into the combustion chamber of the cylinder will tend to cool the exhaust gases passing through the exhaust valve and through passages controlled by the exhaust valve, which passages are arranged diametrically opposite to one another and on opposite sides of the intake passage.

A still further object of the invention is to provide a cylinder head of the character above mentioned, which may be manufactured at a nominal cost, will be thoroughly reliable, practical and efficient in operation, and otherwise well adapted for the purpose designed.

Other objects and advantages of the invention will become apparent during a study of the following description, taken in connection with the accompanying drawings wherein:

Figure 3 is a top plan view thereof.

Figure 4 is a horizontal sectional view taken substantially on the line 4—4 of Figure 2 and looking in the direction of the arrows.

Figure 1:
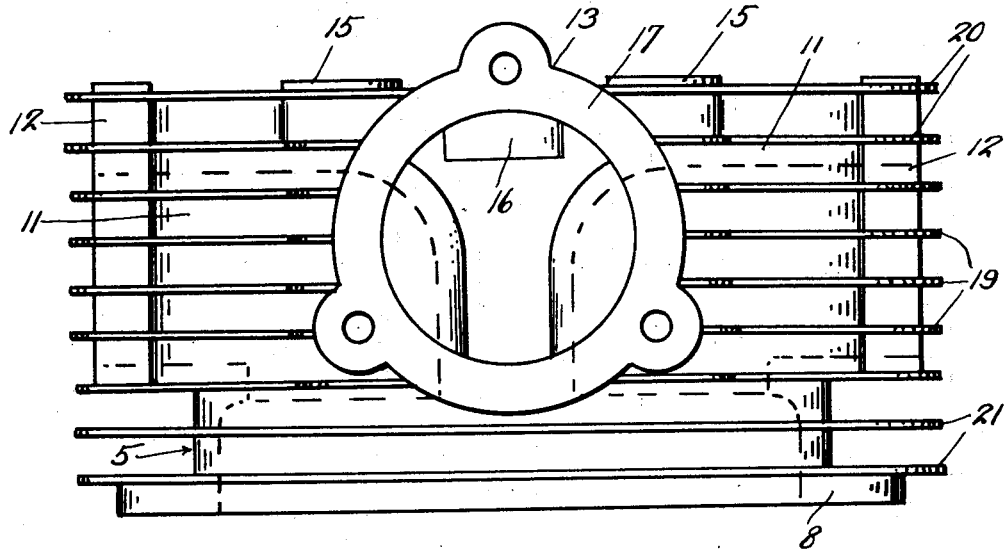
Figure 1 is an elevational view of a cylinder head constructed in accordance with the present invention, and as viewed when looking toward the intake side of the head.
Figure 2:
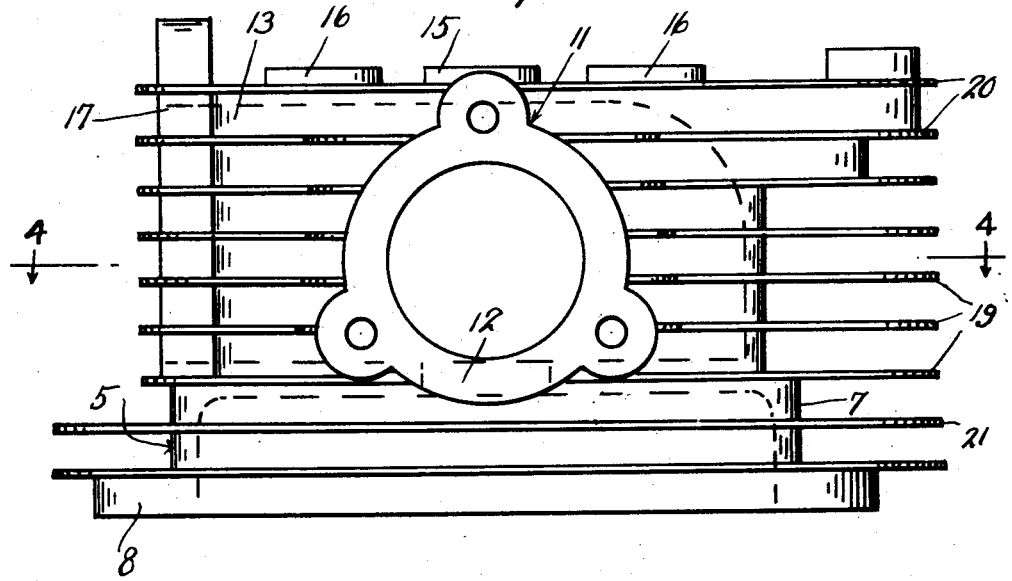
Figure 2 is a similar view looking toward one exhaust side of the head.

With reference more in detail to the drawings, it will be seen that my improved cylinder head is in the nature of a casting preferably made of cast iron and so formed as to provide a cylindrical base 5 including a top wall 6 and a peripheral wall 7, which peripheral wall 7 adjacent the lower end thereof is provided with an outstanding annular attaching flange 8, which flange 8 may be secured to the top of the cylinder of the internal combustion engine in any suitable manner so as to position the cylindrical base 5 in communication therewith.

The top wall of the cylindrical base is provided with a pair of diametrically disposed spaced intake ports 9—9, and a pair of diametrically opposite spaced exhaust ports 10—10.

As will be noted from a study of Figure 4, the ports 10 and 9 are arranged in alternate relation. Cast integrally with the cylinder 5, are a pair of oppositely disposed exhaust elbows 11—11 leading from the ports 10—10, each of these elbows having a flange 12 at its outer end to properly secure and position these elbows to the exhaust manifold not shown of the internal combustion engine.

Also, cast integrally with said cylinder base 5 and extending transversely thereof and crosswise with respect to the elbows 11—11 is a single inlet elbow 13 common to both of the inlet ports 9—9.

As shown to advantage in Figure 4, it will be noted that in welding these parts of the head together, the end walls of the exhaust elbows 11—11 merge into the adjacent side walls of the intake elbow 13 and also extend inwardly of the said intake elbow 13 between the intake ports 9—9 to provide a restricted passage 14 through the intake elbow 13 between said exhaust ports 10—10.

Each of the elbows 11—11 at the top thereof has formed integrally therewith a valve stem guiding member 15 disposed over the exhaust ports 10 as indicated to advantage in Figure 3. Similarly, the intake elbow 13 at its top thereof is provided with a pair of valve stem guide members 16—16 disposed over the respective intake ports 9—9.

Of course, at its outer end, the intake elbow 13 will be formed with a suitably outstanding flange 17, having opposite ears formed thereon to facilitate, the securing and positioning of this elbow with the intake manifold of the internal combustion engine.

Disposed between the vertical walls of the intake elbow, and the said exhaust elbows, is a plurality of suitably spaced cooling fins 19 as well as additional cooling fins 20 which are formed at the top of the head and cooling fins 21 extending about the cylindrical base of the head, all of which cooling fins cooperate to help cool the entire head and keep it at an even temperature.

From the foregoing then, it will be seen that the intake gas passing through the intake elbow 13 and through the ports 9—9 would in thus passing between the inner opposed ends of the exhaust elbows 11—11 and together with the cooling fins running from the exhaust to the intake elbows maintain and help cool, the entire head.

Furthermore, it will be seen that the intake passage formed by the intake elbow 13 runs through the center of the head and transversely thereof and the gases or fuel flowing therethrough will help maintain the valve stem guide of the valve (not shown) for controlling the exhaust ports 10—10, cool, and further aids in cooling the exhaust ports 10 which of course provides the seats for the exhaust valves.

It is believed that from the foregoing description taken in connection with the accompanying drawings, a clear understanding of the operation, construction, utility and advantages of an invention of this nature will be had by those skilled in this art without a more detailed description thereof.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. A four valve cylinder head for internal combustion engines comprising a cylindrical base portion provided on the top wall thereof with a pair of diametrically opposite intake ports forming valve seats, a pair of diametrically opposite exhaust ports arranged in alternate spaced relation with respect to the first mentioned ports, said exhaust ports forming valve seats, an intake elbow formed integrally on said cylindrical base and disposed over said intake ports, a pair of exhaust elbows formed integrally with said cylindrical base, and having their inner ends formed integrally with adjacent side portions of said intake elbow, said intake elbow being provided with a pair of valve stem guides, and each of said exhaust elbows being provided with a valve stem guide.

2. A cylinder head for internal combustion engines comprising a casting including a base, an intake elbow integral therewith, a pair of spaced intake ports formed in said base for connecting said elbow with the cylinder of the internal combustion engine, a pair of oppositely extending exhaust elbows formed integrally with opposite side portions of said intake elbow, exhaust ports arranged in said base for connecting said exhaust elbows with the cylinder of the internal combustion engine, there being one exhaust port for each exhaust elbow, a pair of valve stem guides formed in the top of said intake elbow, a valve stem guide formed in the top of each of said exhaust elbows, said exhaust elbows at their inner ends terminating inwardly of said intake elbow intermediate said intake ports.

In testimony whereof I affix my signature.

GROVER L. WEATHERS.